United States Patent [19]

Weber

[11] Patent Number: 4,486,712

[45] Date of Patent: * Dec. 4, 1984

[54] FREQUENCY DEPENDENT PULSED GAIN MODULATED METALLIC OBJECT DETECTOR

[76] Inventor: Harold J. Weber, P.O. Box 214, 20 Whitney Dr., Sherborn, Mass. 01770

[*] Notice: The portion of the term of this patent subsequent to Jul. 3, 2001 has been disclaimed.

[21] Appl. No.: 305,468

[22] Filed: Sep. 25, 1981

[51] Int. Cl.³ .................. G01V 3/11; G01V 3/165
[52] U.S. Cl. ............................................. 324/329
[58] Field of Search ........................... 324/326–329, 324/67

[56] References Cited

U.S. PATENT DOCUMENTS

| | | | |
|---|---|---|---|
| 2,807,777 | 9/1957 | Doll | 324/329 |
| 4,044,299 | 8/1977 | Weber | 324/326 |
| 4,112,349 | 9/1978 | Weber | 324/326 |
| 4,147,973 | 4/1979 | Weber | 324/329 X |
| 4,161,686 | 7/1979 | Weber | 324/326 |
| 4,295,095 | 10/1981 | Thomas et al. | 324/326 |
| 4,387,340 | 6/1983 | Peterman | 324/326 |

*Primary Examiner*—Gerard R. Strecker

[57] ABSTRACT

A metal detector apparatus particularly adapted as a locator of small, usually obscure, isolated objects such as treasure items, antipersonnel mines, weapons, shrapnel, and other such items. The detector is of the portable transmitter-receiver type having a dual balanced receiving loop, together with a transmitter loop co-balanced relative with the receiving loop arrangement, whereby the unique loop sensing setup, together with a dual channel receiver, provides a separate "right" and "left" bearing indication to the operator of the obscure object's whereabouts. The imbalance between the normally balanced loop arrangement electromagnetic fields, brought about by the nearby presence of a metallic object acts to produce a relative indicative difference in each receiving channel which provides the bearing, while the relative combined indication magnitude gives an indication of proximate distance between the detector and the sought object. The detector provides an automatic, digitally advanced, sequential step-like change in the overall receiver sensitivity through a range of discrete values of responsiveness. Each discrete response value recurs at a related, finite repetition rate which results in an overall characteristic stepped swept gain effect, thereby producing instantaneous variegated values of signal level which are detected at finite threshold levels and thereby usually adapted into a pair of audio frequency tones which, when coupled to an operator's ears, serve to give a stereotonic effect with the average pitch indicating distance, while the pitch difference indicates bearing.

14 Claims, 7 Drawing Figures

FREQUENCY DEPENDENT PULSED GAIN MODULATED METALLIC OBJECT DETECTOR

SUMMARY OF THE INVENTION

My invention teaches a stereotonic, bearing indicative metal detector of the transmitter-receiver ("T-R") type. While I have taught the use of dual channels in a metal locator for providing stereotonic directionality, this earlier teaching in my U.S. Pat. Nos. 4,196,391 and 4,255,710 relates to the beat frequency oscillator type of metal detector. Also, in my earlier teachings, described jointly in my U.S. Pat. Nos. 4,137,500 and 4,147,973 and 4,263,552, I show the use of a separate and usually stationary exciter, which produces a special high frequency a.c. signal which is modulated in a unique repetitive pattern of amplitude steps, together with a portable translator which is moveable relative to the exciter and adapts the exciter energy into a responsive pulse train signal which serves to give indication of the relative field strength of the signal picked up by the translator, either directly from the exciter, or more usefully as an indirect signal picked up from an intervening buried pipe, cable, or other expansive structure. The instant invention directs the essence of these earlier teachings into a unitary, portable metallic object detector which is more particularly suited for locating relatively small, isolated objects, such as coins, lost jewelery, antipersonnel mines, shrapnel, and other such obscurities.

An arrangement of usually three or more loop antennae are located in a predetermined closely associated, albeit spatially displaced orientation whereby the induced fields between one loop, which acts as the transmitting loop, and either of the other two loops, which act as receiving loops, are effectively nulled. The transmitting loop therefore does not directly induce any appreciable signal into either receiving loop. The transmitting loop emanates an expansive electromagnetic field and is energized with a constant amplitude high frequency a.c. signal, preferably of constant frequency. My exciter taught in U.S. Pat. No. 4,095,167 is adaptable as an efficient energy source for this purpose.

While the balanced arrangement of the loop antennae alleviates directly induced signals between the transmitting loop and either receiving loop, the presence of a metallic object within the inductive field reaches of the antennae combination acts to imbalance this relationship with the result that some signal appears to develop across the receiving loop terminals. This developed signal is believed to be wrought by the unbalanced field line extensions which offset the null mode between the transmitting and the receiving loops; by parasitic reradiation of signal energy induced in the metallic object by the transmitting loop field lines, which is picked up by the receiving loops; and by a combination of such effects. The developed signal is about proportional to the obscure object's size, relative conductivity, and distance from the antennae. The field disturbance is also greatest for the receiving loop nearest the object.

The received signal is variously amplified with the instantaneous amplification determined by a plurality of variegated amplitude, cyclically repetative gain control pulses which produce a pattern of harmonious signal levels which, when detected by a threshold or level detector, adapt into a repetitive pulse train the repetition rate of which is proportional to the received signal level. In the preferred embodiment, the detector adapts the object responsive signal sensed by the imbalanced loop antennae state, ocurring when near a metallic object, into an audio tone usually different in exact pitch which couples to each ear, and thereby signals by the pitch difference the relative bearing between the antennae combination and the sought object.

Therefore, it is an object of my instant invention to provide a portable, directional bearing and proximate distance responsive transmitter-receiver metal detector.

Another object is to provide a metal detector which employs a usual combination of a transmitting loop and two receiving loops, with the antennae combination so oriented that negligible signal is directly induced between the transmitting loop and either receiving loop.

Yet another object is to describe a transmitter-receiver metal locator which employs a constant amplitude transmitter and a receiver having cyclically variegated gain control which through receiver sensitivity alteration, produces a train of output signal variations which appear as differing amplitude pulses which change in average amplitude relative to received signal levels, while the instantaneous peak level is a combination of received signal level and the instantaneous pulsed receiver gain determination which is therefrom adapted into a threshold detectable signal, thereby producing a resultant pulse train signal having a repetition rate that is proportional to the receiving loop induced signal level.

Still another object is to provide a metal detector which, in-so-far as is practicable, utilizes digital and pulse signal processing to recover an audio tone comprising a train of discretely advanced pulse repetition rates the instantaneous rate of which is relatable to the receiver loop induced null-error wrought by the presence of the sought object.

While another object is to provide a portable metal detector of the T-R type which is stereotonic, with the indicative tones produced as discrete steps of individual pulse rates exhibiting a repetition rate which is directly derived from the instantaneous received null-error signal.

These and other objects of my instant invention shall become apparent from the further teaching of the ensuing description.

DESCRIPTION OF MY INVENTION

Figure 1:
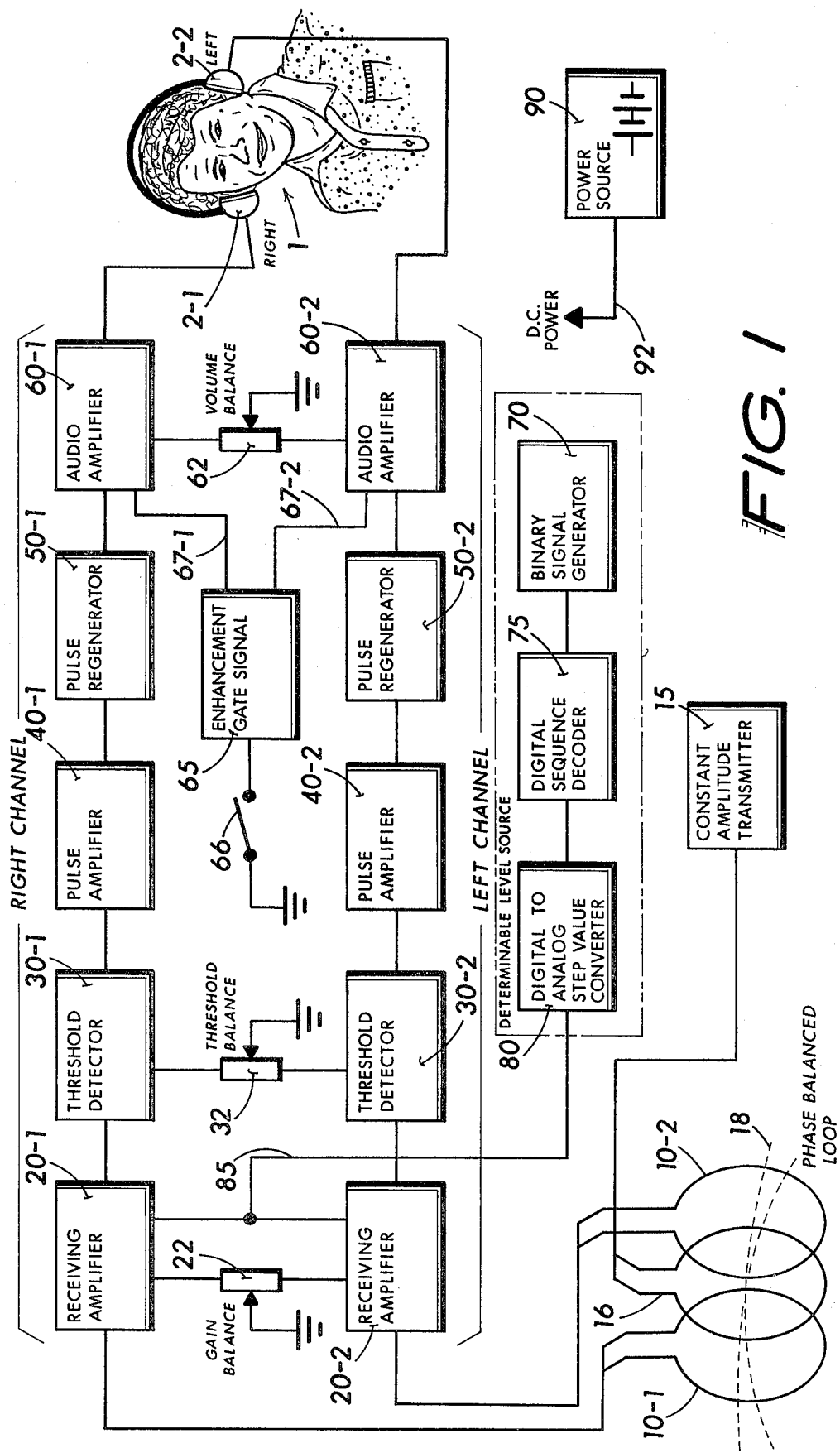
FIG. 1 Essential diagram depicting a T-R metal detector arrangement having a transmitter loop oriented in a phase balanced null position relative with two receiving loops, which when in the presence of a sought object, produces error signals which are processed through "right" and "left" receiving channels, which furthermore combine with a composite signal from the determinable level source, producing earphone indications to an operator as to the concealed metallic objects location and bearing.

The essence of my metal detector appears in FIG. 1, showing apparatus that gives a sense of bearing, as well as relative position, to the operator 1 through the difference in tonal pitch between the audio tones produced in the earphones 2-1, 2-2.

A constant amplitude transmitter 15, which may be adapted from my U.S. Pat. No. 4,095,167, couples with a transmitting antenna loop 16 which, together with two juxtaposed receiving antenna loops 10-1, 10-2, is usually affixed to one end of a short portable staff in the manner well known for metal and treasure detectors. The arrangement of the two receiving loops relative to the transmitting loop produces an electromagnetic null of any induced signal in the receiving loop by the transmitting loop. The transmitted field lines 18 extendibly emanate and produce a far reaching radiated electromagnetic field which is usually balanced, and thereby nulled, relative to each receiving loop. Faraday shielding of each loop furthermore substantially eliminates parasitic capacitive coupling, which otherwise could upset the null balance. Any metallic and usually covert object entering the area of the field line 18 extensions upsets this balanced relationship and a signal is induced in one or both receiving loops 10-1, 10-2 which is proportionally relatable to the bearing relationship between the plural loop arrangement and the metallic finding. The distinctive receiving loop signals so produced each couple with a gain stepped receiving amplifier 20-1, 20-2 which includes a "gain balance" control 22 for equalizing the net gain through each amplifier channel. Each amplifier also includes a gain control input 85 which effects what is usually about equal voltage controlled gain variation in each amplifier. This input couples with a composite multiple value stepped amplitude signal, produced by the combination of a binary signal generator 70, digital sequence decoder 75, and a digital-to-analog step value converter 80 which in combination produces a variegated amplitude, stepped control signal wherein each finite amplitude step recurs at a regular periodic rate which is harmonically related to the different rate of every companion step of other amplitude.

Each amplitude step usually provides an active duration which is somewhat less than the full cycle period of the highest recurrent rate amplitude step and furthermore each singular rate recurrent amplitude signal is usually at an absolute amplitude which is greatest for the less frequently recurring amplitude steps and least amplitude for the most frequently recurring amplitude steps.

In either the "right" or "left" receiving channel, each receiving amplifier output comprises a high frequency a.c. signal which is variously stepped in average albeit instantaneous amplitude by the composite value signal effect on amplifier gain, with the absolute instantaneous level being proportional to the combination of the receiving loop provided signal and the amplifier's gain factor. A threshold detector 30-1, 30-2 is set by a "threshold balance" control 32 to respond with a first binary level therefrom for an a.c. signal amplitude greater than the determinable threshold, and a second binary value for an a.c. signal amplitude which is lesser.

This binary value signal, which due to detector non-linearities may vary somewhat in absolute waveshape, is coupled with a pulse amplifier 40-1, 40-2 which provides some pulse conditioning. A pulse regenerator 50-1, 50-2 may be further provided, which is typically a monostable oscillator serving to normalize the active pulse width to a uniform duration somewhat less than the highest stepped amplitude signal repetition rate provided by the determinable level source. The audio amplifiers 60-1, 60-2 serve to couple the audio rate pulse signal to the operator's earphones 2-1, 2-2 for indication. The enhancement gate signal source 65 provides a sub-audible alternating control signal to the audio amplifiers to produce alternant tone reception in the earphones. This back and forth switching produces a subtle, very sensitive tone comparison for the operator, thereby acting to enhance his ability to clearly differentiate very small tone pitch differences. A switch 66 allows the operator to selectively enable this feature. A battery or other electric power source 90 provides d.c. power 92 as necessary to operate the several electrical circuit functions comprising the metal detector.

Figure 2:
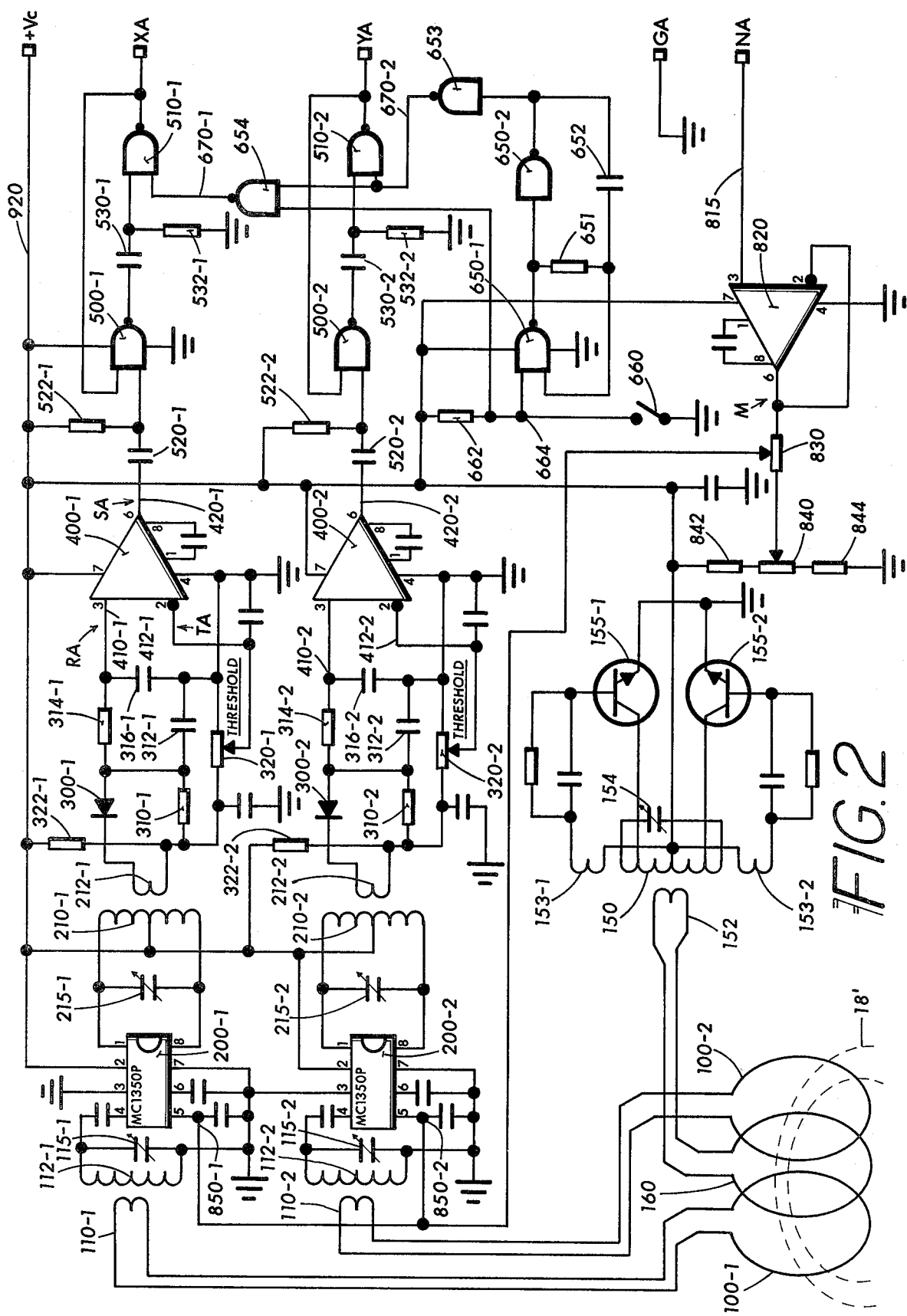
FIG. 2 Circuit diagram for the receiving portions of a preferred embodiment.

The preferred embodiment for one form of my teaching appears in FIG. 2. A transmitter is provided which includes two NPN transistors 155-1, 155-2 (type 2N2222, etc.) hooked up as a push-pull oscillator including the transformer winding 150 resonated with capacitor 154 (typically about 200 kilohertz or less), together with the feedback windings 153-1, 153-2. Properly proportioned, the circuit delivers about 100–200 milliwatts of radio frequency power through winding 152 to excite the transmitter antenna loop 160. An expansive electromagnetic field 18' results, reaching to the sought metal object. Receiving antenna loops 100-1, 100-2 are positioned in an electrically balanced null position relative with the transmitted field lines. Therefore the receiving loops produce negligible output signal when no metal object is nearby, with the output signal increasing in proportion with the relative nearness and size of an obscure metal object. Each receiving loop sees different spatial orientation, this difference therefore produces a different received signal response which serves as a bearing indicative error signal, each signal being separately coupled 110-1, 110-2 through a tuned circuit comprising inductor 112-1, 112-2 and capacitor 115-1, 115-2 (resonant at the transmitter frequency or a harmonic thereof) couple with amplifier element 200-1, 200-2 that may be a MC-1350P integrated circuit made by Motorola Semiconductor Products, Inc. The given amplifiers have gain control inputs 850-1, 850-2 which couple through a dynamic modulation range setting potentiometer 830 to the output of a buffer amplifier 820 which receives a composite control signal on line 815 at input NA. The voltage divider consisting of resistors 842, 844 and potentiometer 840 provides a pedestal d.c. gain control input level for the amplifiers 200-1, 200-2 which serves to set their best operating point for the desired range of gain. The amplifier outputs couple through selective tuned inductors 210-1, 210-2 resonated by capacitors 215-1, 215-2, by way of the secondary windings 212-1, 212-2 with the detector diode 300-1, 300-2 and the threshold biasing network resistors 320-1, 320-2 and 322-1, 322-2 together with detector load resistor 310-1, 310-2 and detector capacitor 312-1, 312-2. The voltage at the tap provided on the variable resistor (potentiometer) 320-1, 320-2 couples to the INVERTING input 412-1, 412-2 of an operational amplifier comparator 400-1, 400-2 for setting the threshold thereof.

The NONINVERTING input 410-1, 410-2 accepts detected negative d.c. signal level from the detector. When the NEGATIVE level on the input exceeds the POSITIVE d.c. threshold established on the other input, a NEGATIVE pulse occurs at the output 420-1, 420-2 which couples through differentiating capacitor 520-1, 520-2 such that the negative going leading edge of the pulse triggers a oneshot multivibrator comprising the gate 500-1, 510-1; 500-2, 510-2 including the timing components 530-1, 532-1; 530-2, 532-2 producing signals on the outputs lines XA, YA. A freerunning multivibrator, having about a one hertz rate including gates 650-1, 650-2 and timing components 651, 652 couples with inverter 653 and control gate 654 to alternately switch the XA and YA outputs "on" and "off" for about one-half second each. Switch 660, together with pullup resistor 662 controls the gating action, being ON when the switch 660 is OPEN.

Figure 3:
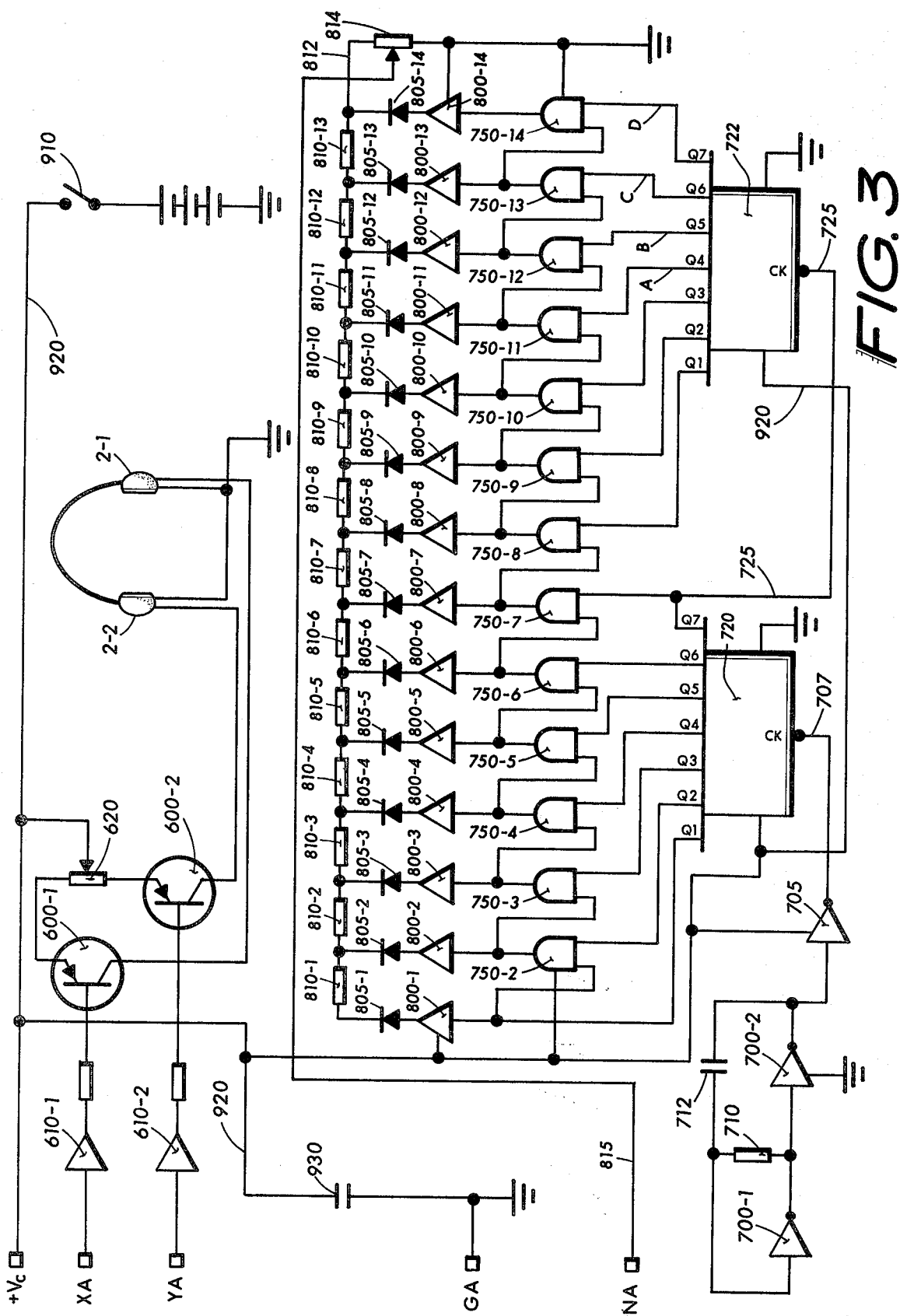
FIG. 3 Circuit diagram for the determinable level source and earphone amplifiers which couples to the receiving portion seen in FIG. 2.

FIG. 3 shows my preferred embodiment for one form of a multiple value stepped amplitude signal producing source providing fourteen distinct levels. The circuit includes a clock signal source having inverters 700-1, 700-2 hooked up as a multivibrator producing a recurrence rate exampledly around 16 kilohertz in my tried model. This signal serves to drive the clock input 707 of the cascade arrangement of the two counters 720, 722 to provide fourteen binary outputs on the Q1–Q7 outputs of each counter, with the Q1 output of counter 720 being one-half the clock signal frequency, descending to the Q7 output of counter 722 which is 1/16, 384-th of the clock frequency, in my model being about 0.977 hertz. This results in a full range of pulse trains, or audio tones, from 8,000 hertz down to 0.977 hertz, with the latter being reproduced later in the operator's earphone more as a "tick" rather than as a "tone". The following chart lists the periodicities of the various pulse train signals produced by the described apparatus:

| OUTPUT | RATE | DERIVATIVE |
| --- | --- | --- |
| 720-Q1 | 8000 Hz | Fc/2 |
| 720-Q2 | 4000 Hz | Fc/4 |
| 720-Q3 | 2000 Hz | Fc/8 |
| 720-Q4 | 1000 Hz | Fc/16 |
| 720-Q5 | 500 Hz | Fc/32 |
| 720-Q6 | 250 Hz | Fc/64 |
| 720-Q7 | 125 Hz | Fc/128 |
| 722-Q1 | 62.5 Hz | Fc/256 |
| 722-Q2 | 31.25 Hz | Fc/512 |
| 722-Q3 | 15.625 Hz | Fc/1024 |
| 722-Q4 | 7.813 Hz | Fc/2048 |
| 722-Q5 | 3.91 Hz | Fc/4096 |
| 722-Q6 | 1.953 Hz | Fc/8192 |
| 722-Q7 | 0.977 Hz | Fc/16384 |

This listing further serves to clearly show the constant harmonic relationship between the derived tones and the clock frequency $F_c$.

The Q1 through Q7 outputs of each counter 720, 722 are combined in the AND gates 750-2 through 750-14, the resulting control signal outputs of which drive buffers 800-2 through 800-14, whilst buffer 800-1 is driven directly by the Q1 output of the counter 720. The buffers coupled with steering diodes 805-1 through 805-14 and summing resistors 810-1 through 810-13 producing a composite variegate amplitude stepped signal at juncture 812, thereby providing 8,192 unique multilevel pulse pattern combinations before the cycle repeats about every 1.024 seconds. The tap on potentiometer 814 is predetermined to deliver a portion of this developed signal pattern on line 815 through the shown connection NA which couples with a like connection in FIG. 2. This overall arrangement provides a modulated gain control of the amplifiers 200-1, 200-2 in FIG. 2 which follows the unique signal format developed by the circuit of FIG. 3.

The pulse signals, e.g. audio tones, developed by the FIG. 2 circuit couple in through terminals XA and YA to buffers 610-1, 610-2 and PNP transistors 600-1, 600-2, such as type 2N6076 which provide the pulse current gain to drive the earphones 2-1, 2-2. Potentiometer 620 serves as a "volume balance" control by differentially varying the emitter degeneration in either of the PNP amplifier transistors, thereby varying the pulse current through either earphone.

D.c. power is supplied by a battery which provides portable operation of the apparatus and typically comprises eight size "AA" dry cells coupled through power switch 910 to the $+V_c$ power bus 920.

Figure 4:
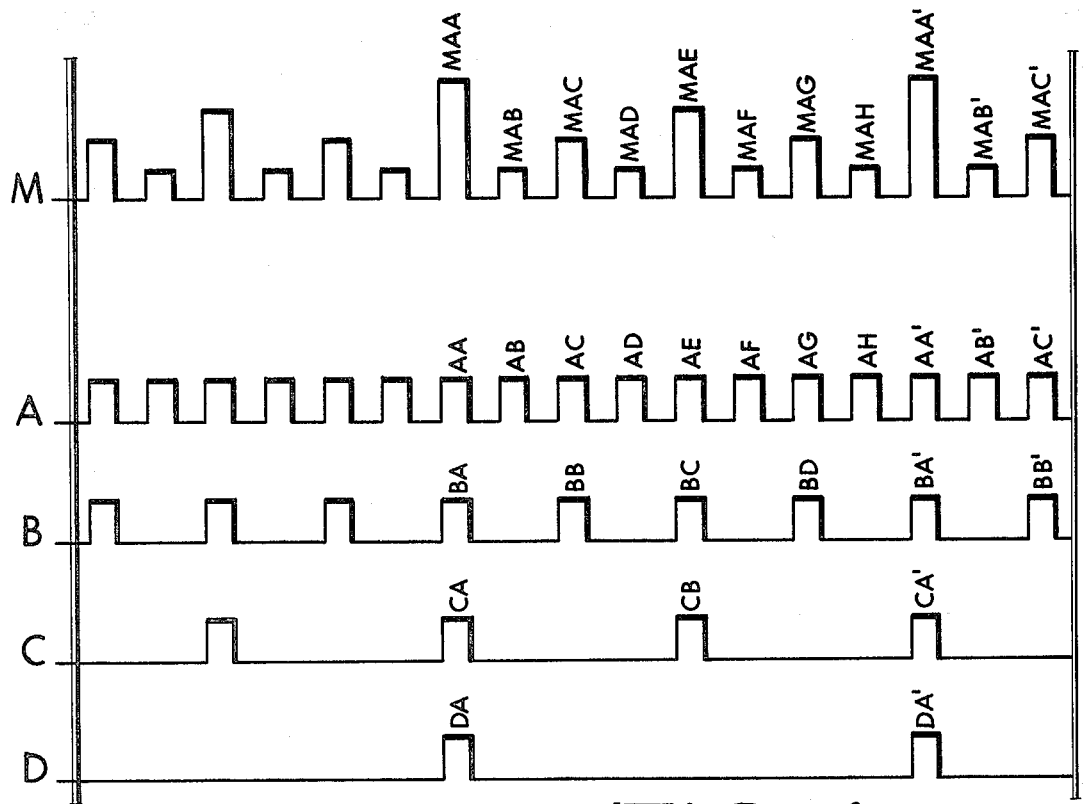
FIG. 4 Pulse waveforms showing various timing and amplitude relationships.

The waveform drawing of FIG. 4 depicts the portion of the multilevel pulse signal appearing on the NA line M in my FIG. 3 as coupled to FIG. 2. This portion comprises the signal on the first four counter 720 outputs Q1 through Q4 as processed by the AND gates and yielding the A, B, C, D signals shown for FIG. 3. What is clear is the amplitude relationships. The MAA pulse, which is of maximum amplitude, is produced when the least frequent DA pulse occurs, whereas the amplitude is proportionately lesser for the more frequent A, B, and C pulses.

Figure 5:
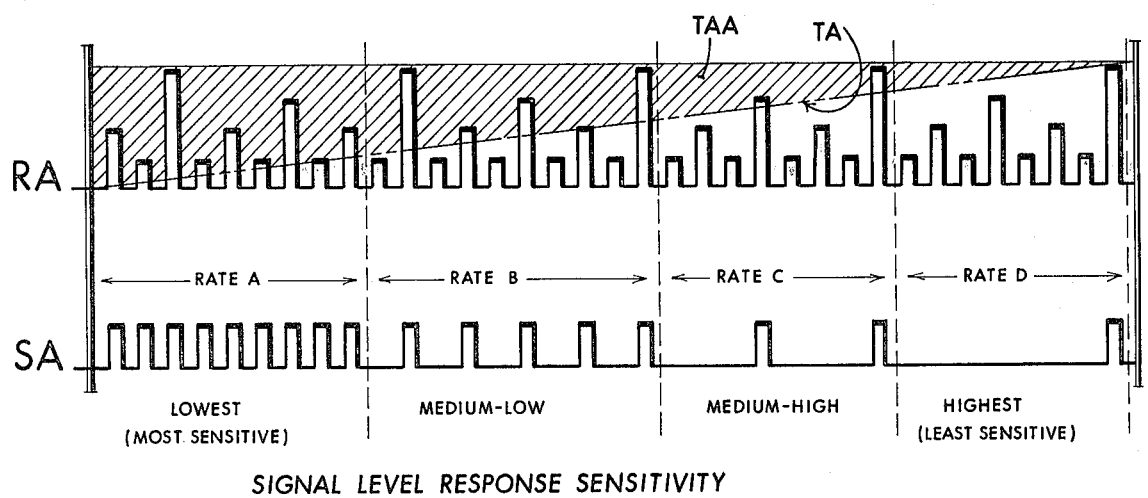
FIG. 5 Pulse wavefor showing threshold detector level response.

The FIG. 5 waveform depicts how the comparator threshold signal TA is related to the incoming detected signal RA so that whenever an incoming RA signal exceeds the threshold TA into the shaded region TAA, an output pulse SA is produced from the comparator. As the threshold level increases, the effective output pulse rate changes from A through D, from the highest rate to the lowest rate. This is a factor of four change for the pulse examples reflected from FIG. 4.

Figure 6:
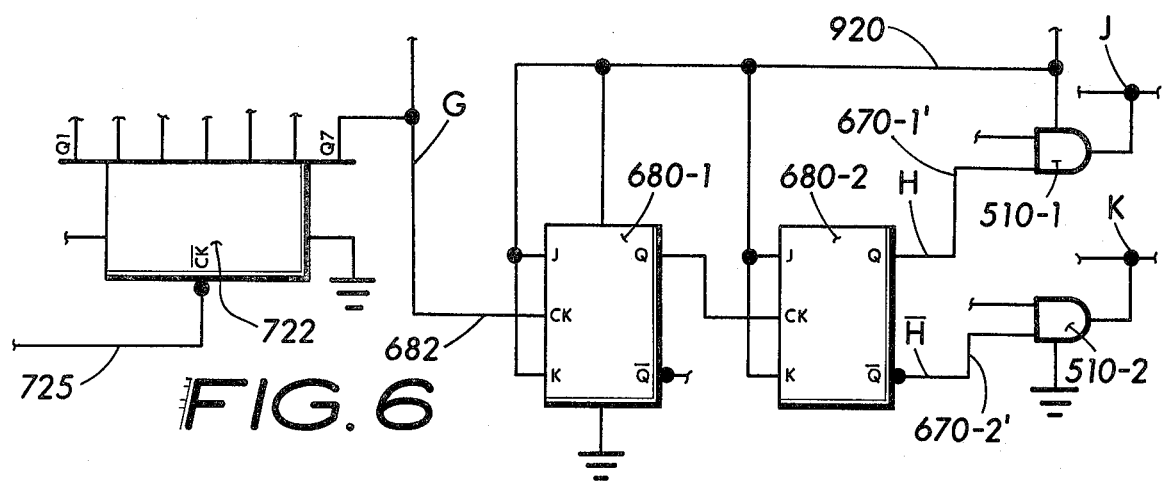
FIG. 6 Circuit for providing enhancement gate signals from the composite signal source.
Figure 7:
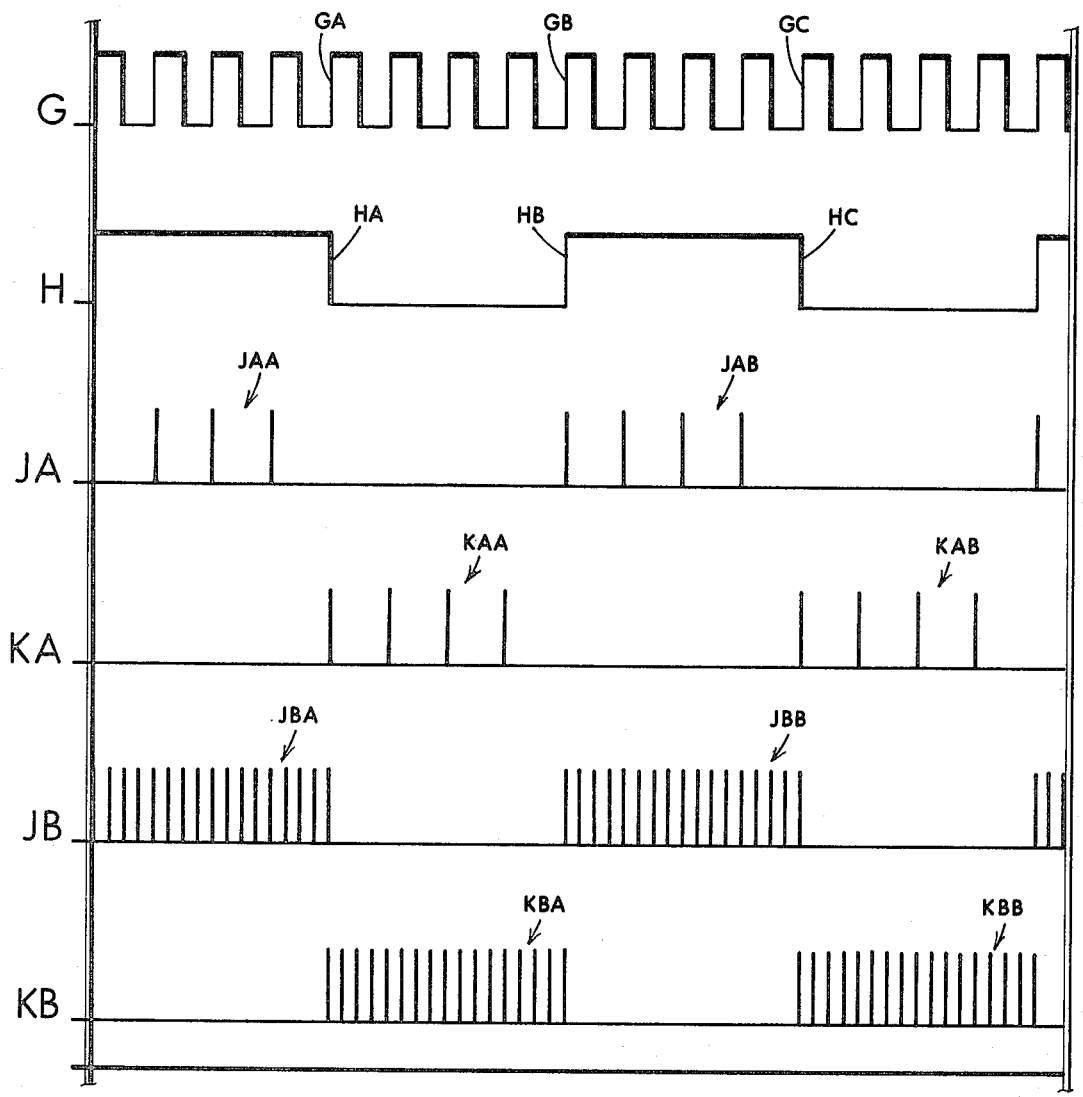
FIG. 7 Waveform representation showing effect of enhancement gate signal in combination with the recovered earphone pulse signals.

The alternant gate signal is derived from the clock signal in FIG. 6. The "J-K" flipflops 680-1, 680-2 offer a divide-by-four function hooked to Q7 output of counter 722 in FIG. 3. This action provides a triggering signal 682 which is divided to provide two alternant low periodicity rate signals coupled by lines 670-1', 670-2' to the AND gate 510-1, 510-2 inputs. The effective action is shown in FIG. 7 where the 0.977 hertz G signal is further divided to provide the H signals which transistion HA, HB, HC on the leading edge GA, GB, GC of every fourth G pulse. The result is the J tone pulse outputs from gate 510-1 and the K tone outputs from gate 510-2 produces alternate tone bursts JA, JB; and KA, KB where that part JAA, JAB; JBA, JBB coincides with one-half of the H cycle, whilst the other part KAA, KAB; KBA, KBB coincides with the second half of the H cycle.

The elements comprising my metal detector, when properly coupled to each other as is shown in FIGS. 2 and 3, form a compact arrangement which can principally be contained upon a printed circuit board or like support means within a protective housing affixed to the earlier mentioned short staff, near the end opposite from the location of the several antenna loops. This provides a convienent portable arrangement which can be easily handcarried and used to search the ground for buried objects such as coins, jewelry, and other metallic items. My model which operates successfully utilizes the following key components:

| | |
|---|---|
| integrated circuit 200-1, 200-2 | MC-1350P (Motorola) |
| integrated circuit 400-1, 400-2 | CA-3130 (R.C.A.) |
| integrated circuit 500-1, 500-2, 510-1, 510-2, 650-1, 650-2, 652, 654 | C-MOS type CD4011BE |
| integrated circuit 750-2 through 750-14 | C-MOS type CD4081BE |
| integrated circuit 720, 722 | C-MOS type CD4024AE |
| integrated circuit 800-1 through 800-14 | C-MOS type CD4050AE |
| integrated circuit 700-1, 700-2, 705 | C-MOS type CD4069BE |
| integrated circuit 680-1, 680-2 | C-MOS type CD4027BE |
| diodes 300-1, 300-2 | 1N34A |
| diodes 805-1 through 805-14 | 1N914 |
| tuned transformers 210-1, 210-2 | 165 kilohertz |

The foregoing parameters and values are given by way of example only to assist one of average skill in the art to duplicate the fruits of my invention and shall not construe limitation in any way upon the scope of my invention.

While my invention has been shown to use particular circuit combinations, a person skilled in the art can accomplish the objects of my invention through a myrid of other circuit embodiments without departing from the essence of the invention.

While my invention is shown to use a particular method of stepped, composite multilevel gain control signal generation, any other way provided by one skilled in the art which produces similar effects shall be satisfactory for attaining the central object of my teaching.

Although I describe the metal detector as a portable, hand carried apparatus, this shall not limit it to this configuration alone, but might include a submersible form, or one that is affixed to or part of another machine, or that is itself propelled, or that is transported in some other manner.

What I claim is:

1. Metal detector apparatus adapted to provide a sensory indication of proximate orientation between the detector and an obscure metallic object; comprising:
   a. transmitter means providing a source of high frequency alternating current energy having substantially constant frequency and amplitude;
   b. portable transmitting loop antenna means, coupled with said transmitter means, effective to produce a radiated electromagnetic field;
   c. receiving loop antenna means disposed about the transmitting loop antenna means, with a substantially fixed arrangement predetermined to effectively provide a minimal received signal therefrom as produced by electrical null of electromagnetic coupling directly therebetween, whilst producing increased received signal proportional to the relative imbalance of said null wrought by the presence of a metallic object within the combined transmitting loop and receiving loop antenna means field of influence;
   d. digital sequency signal source means effectively producing several series of pulse train signals having different intrinsic periodicity rates therebetween while having harmonic relationship thereamongst;
   e. digital-to-analog stepped signal converter means coupled with said sequency signal source, effective to receive pulse train signals therefrom and produce a composite signal comprising a repetitious continuum of various amplitude value steps, each constituent step of which has a predetermined amplitude value correspondent with a unique combination of at least one and usually several of the pulse train signals instantly produced by said sequency signal source;
   f. receiver means coupled with said receiving loop antenna means, provided with an effective signal level control input thereto coupled with said composite signal, and a converted output therefrom; operative to combine, as by modulation, said received signal with said composite signal so as to produce a repetitive sequence comprising bursts of converted received signal having various values of predetermined amplitude; and further includes threshold detector means responsive with the instant values of said converted received signals to repetitively produce at least a first level pulse signal therefrom when said converted received signal exceeds a predetermined threshold value, and a second level pulse signal therefrom when said converted received signal shortfalls the predetermined threshold value;
   g. indicant means coupled to said pulse signal produced by said threshold detector means; and,
   h. direct current power source means effective to provide operating voltage and current to each of the thereto coupled functional elements comprising the said detector.

2. Apparatus of claim 1 wherein said receiver means comprises:
   a. high frequency a.c. amplifier means having a signal input thereto coupled with said receiving loop antenna means, an amplified a.c. signal output, and a control input thereto which effects variation of gain through the amplifier means; and,
   b. threshold detector means coupled with said a.c. signal output and effective to instantaneously convert the amplified a.c. signal coupled from the said a.c. amplifier into a substantially unipolar first level pulse signal when the a.c. signal is above the predetermined threshold value and alternatively a second level pulse signal when the a.c. signal is below the predetermined threshold value.

3. Apparatus of claim 2 wherein the predetermined threshold value average effect is settable as an operator control, thereby providing a change in overall metal detector sensitivity.

4. Apparatus of claim 1 wherein further a pulse amplifier means is coupled between said threshold detector means and said indicant means being therewith effective to increase the efficaciousness of at least one parameter of pulse amplitude, pulse shape, and active pulse duration of the therebetween coupled pulse signal.

5. Apparatus of claim 2 wherein further a pulse generator means is coupled between said threshold detector means and said indicant means being therewith effective to normalize the efficaciousness of the therebetween coupled pulse signal amplitude and active pulse duration.

6. Apparatus of claim 1 wherein said digital sequency signal source means comprises:
   a. clock signal source having a periodic rate that is a predetermined even multiple of the highest periodicity rate pulse train signal;
   b. binary divider means having a clock input thereto coupled with said clock signal source, effective to produce a different integral periodicity rate pulse train signal at each of several outputs;

c. digital sequence decoder means coupled with the binary divider several outputs and effective to combine the therefrom obtained binary signal trains into several ordered pattern pulse trains, each of a different periodic rate comprising a harmonic series, each having an active period less than the full cycle period of the highest periodicity rate said binary signal train, and each provided at one of a plurality of outputs therefrom; and, Wherein further said digital-to-analog stepped signal converter means comprises:

d. value summing means coupled to said decoder outputs and operative to produce a composite pulse train signal comprising a sequence of substantially equal period pulses having different instantaneous voltage amplitudes, each amplitude corresponding, respectively, to a combination of usually several different ordered pattern pulse trains and recurring at the rate determined by the dominant combination of corresponding ordered pattern pulse train rates.

7. Apparatus of claim 1 wherein said periodic rate of each component said pulse train signal produced by the digital sequency source means recurs at audible and subaudible rates between about 2 hertz and about 20 kilohertz.

8. Apparatus of claim 7 wherein said indicant means includes audio amplifier means to increase at least the effective amplitude of the pulse signal produced by said threshold detector means.

9. Apparatus of claim 8 wherein said indicant means is an audio transducer means.

10. Apparatus of claim 1 wherein further at least two effectively separate acting receiving channels comprising responsively separate receiving loop antennae means, receiver means, and indicant means are provided, together with an effectively common transmitter means, transmitting loop antenna means, digital sequency source means, digital-to-analog stepped signal converter means, and power means; wherein said receiving loop antennae means are each electromagnetically displaced therebetween whilst having substantially common electromagnetic orientation relative with said transmitting antenna means; whereby each receiving antenna means obtains different null imbalance response relative with the metallic object which serves to enter an indicated sense of relative bearing between the loop antennae arrangement and the metallic object.

11. Apparatus of claim 10 wherein further, an enhancement gate signal source produces two effective gating signals, the individual efficacious periods of which are alternant at a low, subaudible frequency usually on the order of 0.5 to 2 hertz; whereby the enhancement gate signal couples to each plural said receiver means to produce an alternation of the outputted pulse signals produced therefrom.

12. Apparatus of claim 10 wherein further "gain balance" control means is provided which couples with each receiver means to balance the ratios of effective gain obtained therebetween.

13. Apparatus of claim 10 wherein further "threshold balance" control means is provided which couples with each receiver means to balance the said predetermined threshold values therebetween.

14. Apparatus of claim 10 wherein the pulse signals produced by the receiver means output are essentially audio frequency signals and the therewith coupled said indicant means are effectively separate ear responsive audio transducers, and "volume balance" control means is provided to therebetween balance the loudness of the audible signal, usually as a compensation for an operator's individual ear sensitivities.

* * * * *